United States Patent [19]

Aimiya

[11] Patent Number: 5,416,655

[45] Date of Patent: May 16, 1995

[54] MAGNETIC DISK APPARATUS HAVING A MOTOR DRIVEN DISK CLAMP

[75] Inventor: Takayuki Aimiya, Ibaragi, Japan

[73] Assignee: NEC Corporation, Tokyo, Japan

[21] Appl. No.: 231,476

[22] Filed: Apr. 22, 1994

[30] Foreign Application Priority Data

Jun. 23, 1993 [JP] Japan .................................. 5-150956

[51] Int. Cl.6 ............................................. G11B 17/02
[52] U.S. Cl. .................................................. 360/99.08
[58] Field of Search ............... 360/98.07, 99.04, 99.05, 360/99.08, 99.12

[56] References Cited

U.S. PATENT DOCUMENTS 5,195,002  3/1993  Sakurai ............................. 360/99.08

Primary Examiner—A. J. Heinz
Attorney, Agent, or Firm—Sughrue, Mion, Zinn, Macpeak & Seas

[57] ABSTRACT

A magnetic disk apparatus has a sealed up space between a base plate and its cover. A magnetic disk with its spindle motor for driving the magnetic disk, and magnetic heads with respective carriages for displacing respective heads are enclosed in the sealed up space. Rotor unit of the spindle motor is supported by a bearing fixed to the base plate, and stator unit of tile motor is fixed to the cover.

4 Claims, 5 Drawing Sheets

MAGNETIC DISK APPARATUS HAVING A MOTOR DRIVEN DISK CLAMP

BACKGROUND OF THE INVENTION

This invention relates to a magnetic disc apparatus, and more specifically relates to an apparatus where a magnetic disk (or magnetic discs) and magnetic heads are contained in a sealed up space made between a base plate and its cover.

FIG. 5 shows an example of a cross sectional view of such magnetic disc apparatus of prior art. The apparatus shown by FIG. 5 comprises a magnetic disk 1 rotated by a spindle motor 2, a magnetic head 3 which magnetically couples to the magnetic disc 1, a carriage 4 which displaces the magnetic head 3 in a radial direction of the magnetic disk 1, a base plate 5 on which the carriage 4 is mounted, and a cover 6 for making a sealed up space between the base plate 5 for containing the magnetic disk 1 with the spindle motor 2 and the magnetic head 3 with the carriage 4.

A housing 11 of the spindle motor 2 is fixed to the base plate 5, and in a central portion of the housing 11, a ball bearing having an upper ball bearing 12 and a lower ball bearing 13, is fixed. A spindle 14 of the spindle motor 2 is supported rotation-free by the ball bearing. On top of the spindle 14, a cylindrical hub 15 having a hollow inner space is fixed at the axial center.

The magnetic disc 1 is mounted on the perimeter of the hub 15, clamped by a clamper 16, and is rotated by the spindle 14. The spindle motor 2 comprises a stator unit 18 and a rotor unit. The rotor unit is fixed to the hub 14 with its pole pieces 17 of permanent magnet and a yoke 19 which makes magnetic circuits between the pole pieces. The stator unit 18 comprising stator windings and stator magnetic circuits, is fixed to the housing 11, surrounding the outer ring of the ball bearing. Thus, central axis of the rotor unit is aligned to that of the stator unit 18, and an adequate clearance is maintained between the faces of the pole pieces 17 and the circumference of the stator unit 18.

When the stator windings are excited, the rotor unit of the spindle motor 2 rotates the hub 15 and the magnetic disk 1 clamped to the hub 15.

In a heretofore known magnetic disc apparatus as shown in FIG. 5, all the component parts of the spindle motor 2 together with the housing 11 and the bearing of the spindle are fixed on the base plate 5, and spaces near the cover 6 are not effectively utilized.

SUMMARY OF THE INVENTION

Therefore, an important object of this invention is to design a magnetic disc apparatus wherein spaces near the cover is effectively utilized.

In order to achieve the object, the stator unit of the spindle motor is attached to the cover in a space near the cover.

Another object of this invention is to reduce the diameter of the housing. This is made feasible as the stator unit is removed from the housing.

Still another object of this invention is to reduce number of pieces required for assembling the rotor unit. This is made feasible as the rotor unit is placed on a same side of the hub with the clamper, and the yoke of the rotor unit is combined to the clamper as one body.

Thus, in an embodiment of this invention, a magnetic disc apparatus having a base plate and its cover making a sealed up space, comprises:
  a housing fixed to the base plate for housing a bearing,
  a spindle supported rotation-free by the bearing,
  a hub radially extended from the spindle,
  a clamper for fastening a magnetic disc to the hub,
  a rotor unit of the spindle motor fixed to the clamper, the rotor unit comprising pole pieces of permanent magnet and a yoke for making magnetic circuits between the pole pieces,
  a stator unit of the spindle motor fixed to the cover with its axis aligned to that of the rotor unit.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
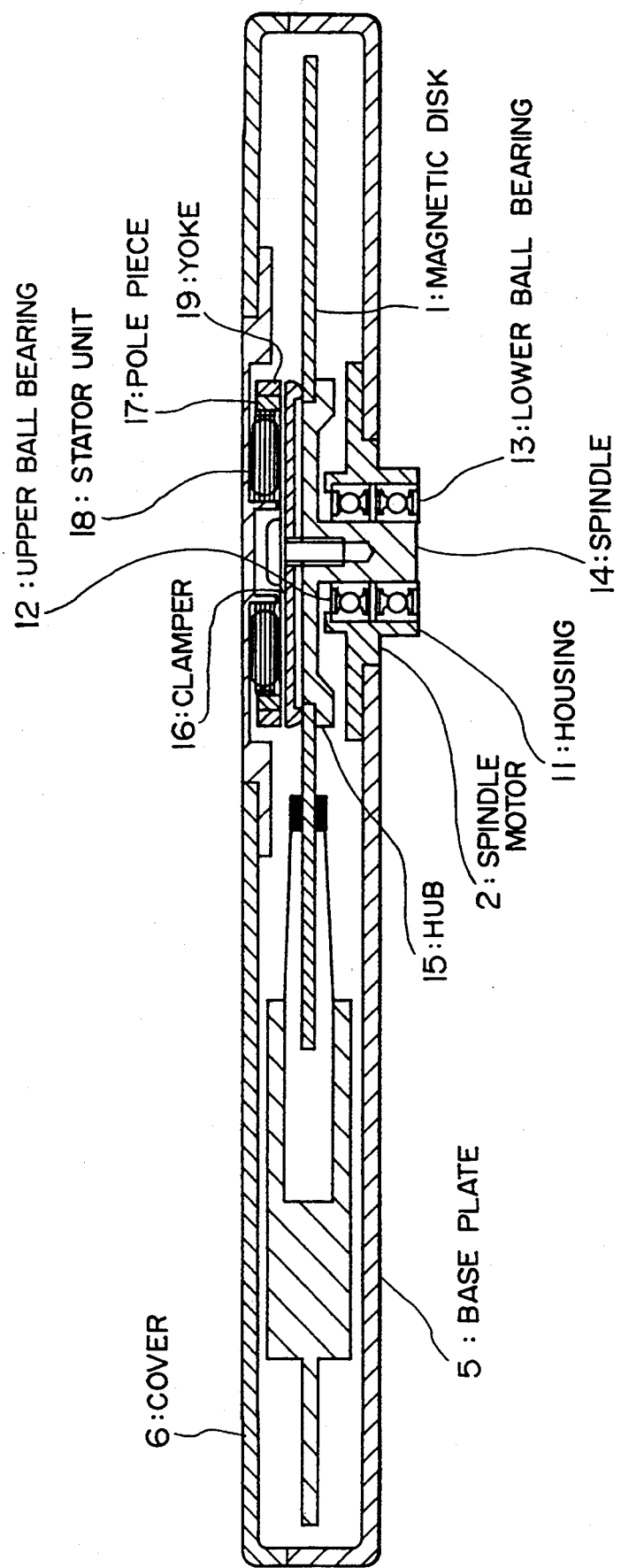
FIG. 1 shows a cross sectional view of an embodiment of this invention.

Referring to FIG. 1, there is shown an embodiment of this invention. The upper ball bearing 12, the lower ball bearing 13, and the spindle 14 in FIG. 1 are respectively similar to corresponding parts in FIG. 5, and will need no further explanation. The shape of the hub 15 of FIG. 1 is simpler than that of FIG. 5, since there are no stator unit and no rotor unit under the lower surface of the hub 15 of this invention.

Figure 5:
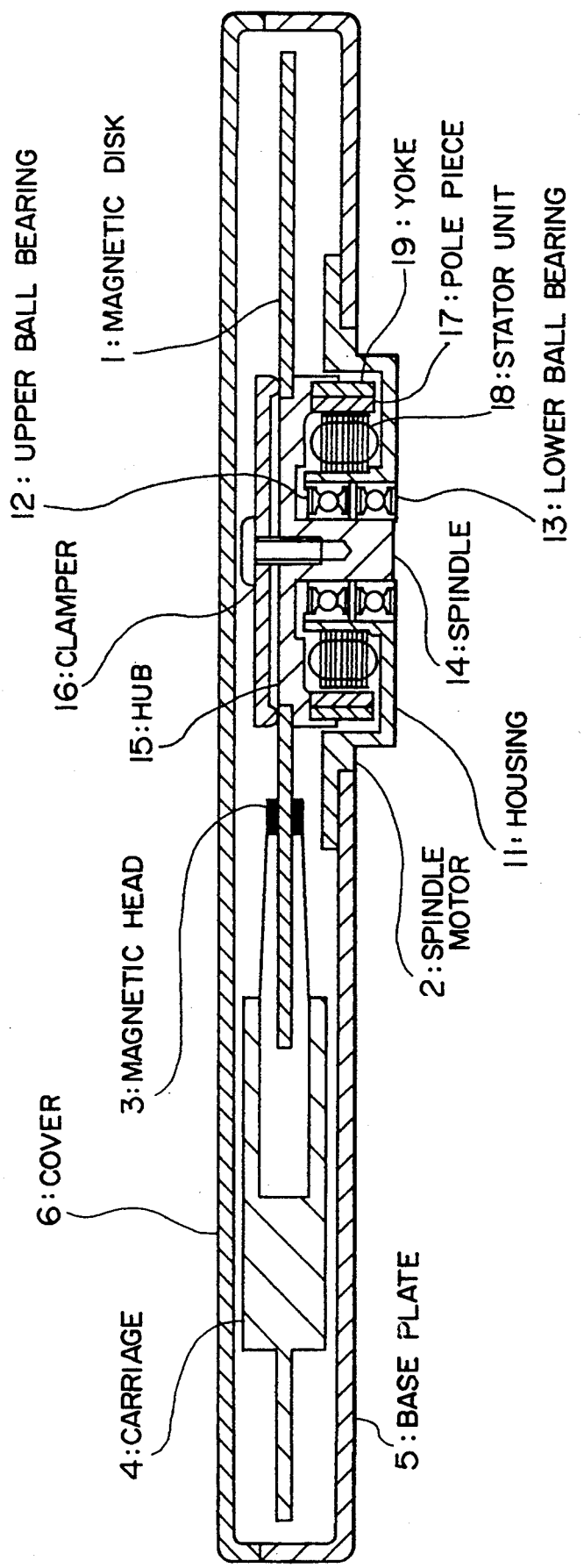
FIG. 5 shows a cross sectional view of a magnetic disc apparatus of prior art.

And the diameter of the housing 11 of FIG. 1 can be made much smaller than that of FIG. 5, since the stator unit 18 and the rotor unit of this invention are removed from the housing 11 of FIG. 1.

In FIG. 1, at least one magnetic disc 1 is mounted on the hub 15 and is fastened by the clamper 16, in a similar manner as in FIG. 5.

And on the clamper 16 is placed the rotar unit with pole pieces 17 of permanent magnet and the yoke 19. The stator unit 18 of this invention is fixed to the cover 6. The center axis of the stator unit 18 must be aligned to that of the rotor unit, and a predetermined clearance must be maintained between the faces of the pole pieces 17 and the periphery of the stator unit 18. Fine adjustment for the alignment is performed in a conventional way and is not described here.

When stator windings of the stator unit 18 is excited, the rotor unit drives the hub 15 and rotates the magnetic disc 1 with the spindle 14.

Figure 2:
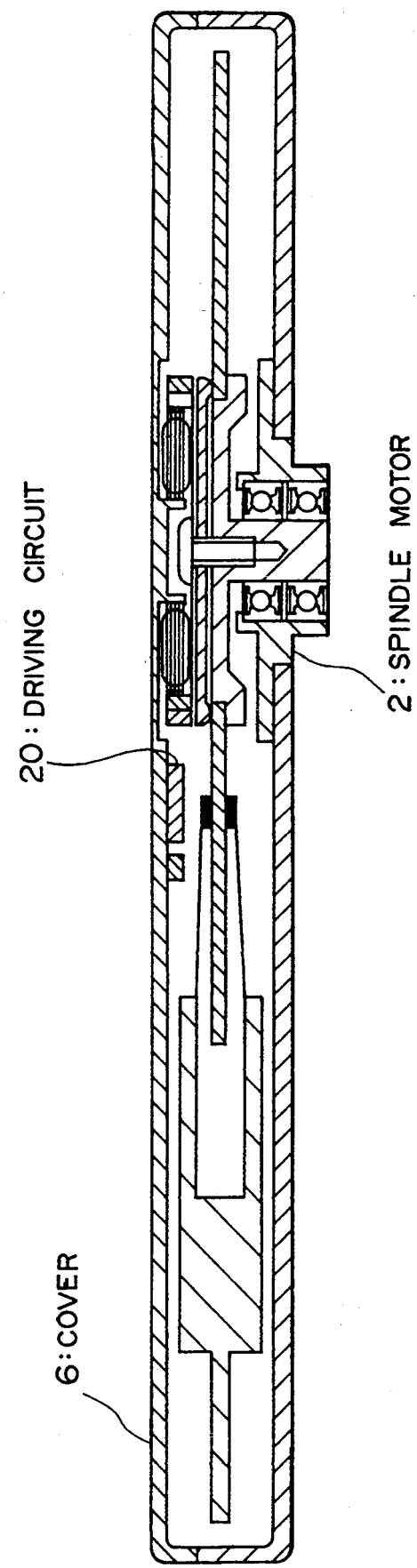
FIG. 2 shows a cross sectional view of another embodiment of this invention.

In an embodiment shown by FIG. 2, a driving circuit unit 20 for driving the spindle motor 2 is fixed to the cover 6.

Figure 3:
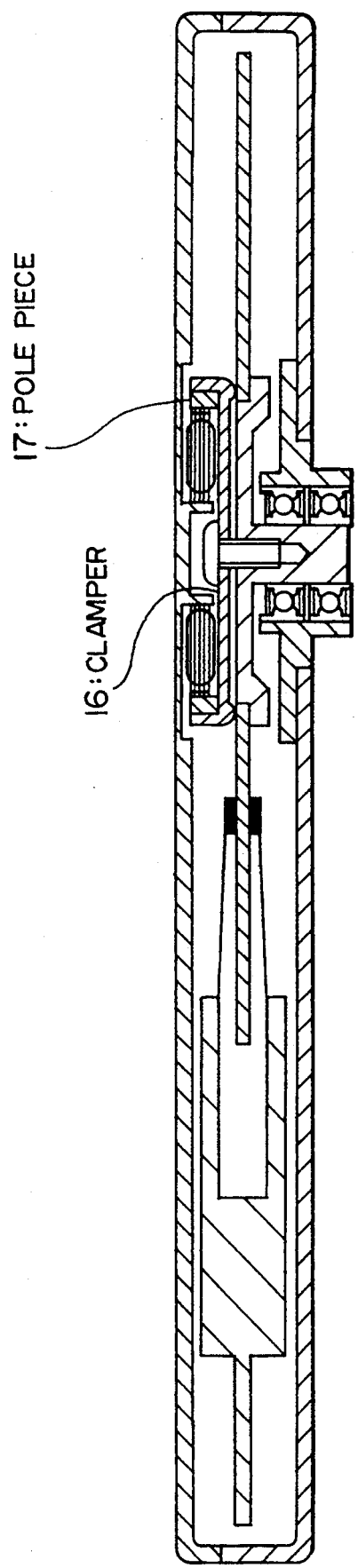
FIG. 3 shows a cross sectional view of still another embodiment of this invention.

In an embodiment shown by FIG. 3, the clamper 16 and the yoke 19 are united to one body, wherein the clamper 16 is made of a magnetic material, and the rim of the clamper 16 is bent upward to form a short cylinder. The pole pieces 17 of permanent magnet are installed on the inner surface of the short cylinder.

Figure 4:
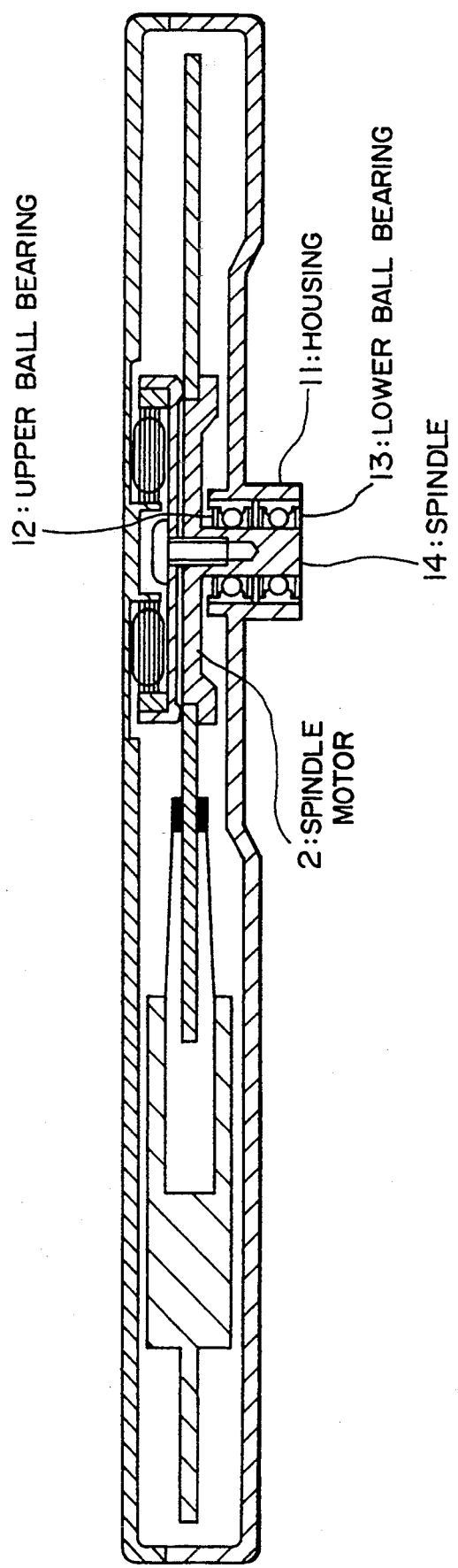
FIG. 4 shows a cross sectional view of still another embodiment of this invention.

And, in an embodiment shown by FIG. 4, an inner ring of the ball bearing comprising the upper ball bearing 12 and the lower ball bearing 13 is united to the peripheral surface of the spindle 14. This unification further reduces the diameter of the housing 11.

What is claimed is:

1. A magnetic disc apparatus comprising a base plate and its cover making a sealed up space for containing at least one magnetic disc rotated by a spindle motor, plural magnetic heads for coupling to magnetic field of said at least one magnetic disc; characterized in that said apparatus comprises:

a housing fixed to said base plate for housing a bearing, a spindle supported rotation-free by said bearing, a hub radially extended from said spindle, a clamper for fastening said at least one magnetic disc to said hub, a rotor unit of said spindle motor fixed to said clamper, said rotor unit comprising pole pieces of permanent magnet and a yoke for making magnetic circuits between said pole pieces, a stator unit of said spindle motor fixed to said cover with its axis aligned to that of said rotor unit when said cover and said base plate are assembled to make said sealed up space.

2. A magnetic disc apparatus of claim 1, wherein a drive circuit unit for driving said spindle motor is fixed to said cover.

3. A magnetic disc apparatus of claim 1, characterized in that said clamper and said yoke are united as one body, wherein said clamper is made of a magnetic material and has an upwardly bent cylindrical rim where said pole pieces are fixed.

4. A magnetic disc apparatus of claim 1, wherein inner ring of said bearing is united with said spindle of said spindle motor.

* * * * *